United States Patent Office 3,384,553
Patented May 21, 1968

3,384,553
METHOD AND EQUIPMENT FOR AEROBIC FERMENTATION ON LIQUID CULTURE MEDIUMS
Zdeněk Čáslavský and Jaroslav Hospodka, Prague, Czechoslovakia, assignors to Ceskoslovenska Akademie Ved, Prague, Czechoslovakia
Filed Apr. 8, 1965, Ser. No. 446,681
17 Claims. (Cl. 195—95)

ABSTRACT OF THE DISCLOSURE

In a method of aerobic cultivation of microorganisms in contact with a liquid culture medium and under admission of oxygen-containing gas preferably at a constant rate, the addition of nutrient to the culture is controlled by determinations of dissolved oxygen in the culture so that when the concentration of dissolved oxygen exceeds a predetermined value nutrients are added and thereby the dissolved oxygen concentration is maintained within predetermined limits, and an arrangement comprising a fermentation vessel, a container for storing nutrients, a dispensing device which may be activated for introducing nutrients from the container into the fermentation vessel, and an arrangement for sensing the dissolved oxygen concentration in the liquid culture medium located in the fermentation vessel and for actuating the dispensing device when the sensed dissolved oxygen concentration in the liquid culture medium rises above a preset limit.

---

Figure 1:
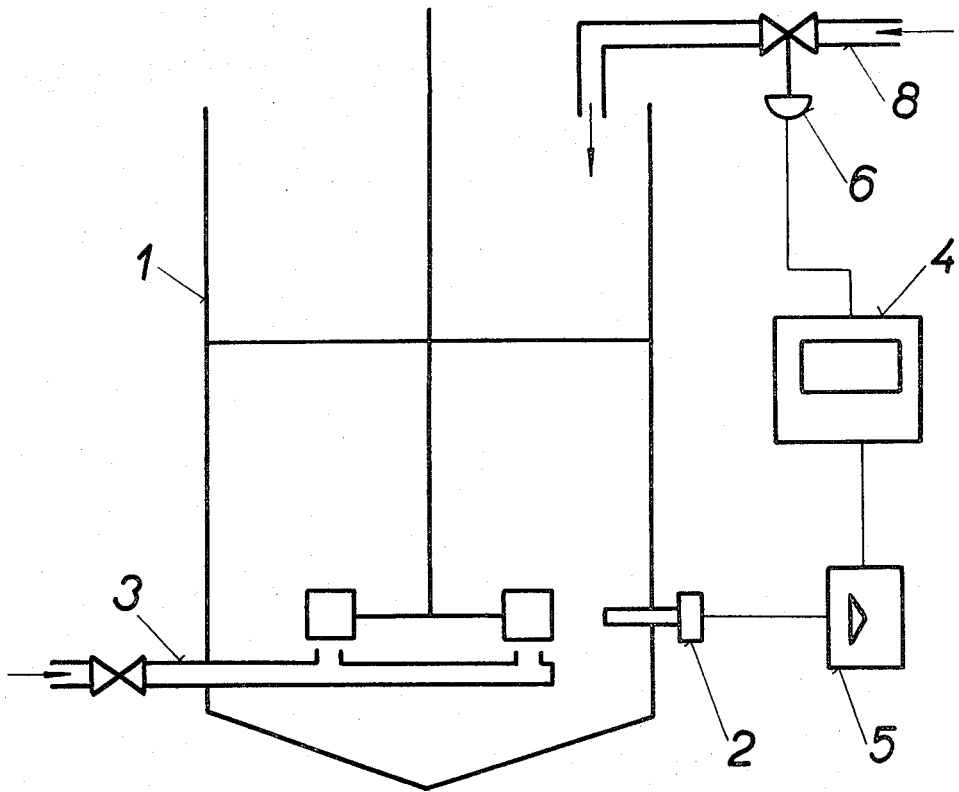

The present invention relates to a method and apparatus for aerobic fermentation on liquid culture media and, more particularly, the present invention is concerned with a method and apparatus for aerobic cultivation of microorganisms on liquid culture media under admission of air and with continuously and simultaneously controlled concentration of dissolved oxygen and oxygen uptake rate by microorganisms.

Several procedures have been suggested for the maintenance of the concentration of oxygen which is dissolved in a liquid culture medium. For instance, according to one method particularly directed to the production of baker's yeast, the amount or proportion of oxygen dissolved in the culture medium is controlled by the admission of variable amounts of air. According to another method, the supply of liquid culture medium and of air is made dependent on the composition of the gases escaping from the reaction or fermentation vessel. However, these and other prior art procedures have the disadvantage that only the rate of admission of air, or the amount of air which is admitted into the culture medium will be regulated, but not the rate of the consumption by microorganisms of the oxygen contained in the thus-admitted air. It is possible that by following these methods the concentration of dissolved oxygen in the culture medium may suddenly change in an unrestrained or uncontrolled manner to a value above the optimum value for the growth of the microorganisms and/or for the formation of the desired final product, or the concentration of dissolved oxygen may drop below the optimum value for the above purposes. Besides, changes in the rate of air supply into a liquid culture medium tend to cause undesirable foaming.

It is therefore an object of the present invention to overcome the above discussed difficulties and disadvantages.

It is a further object of the present invention to provide a method and apparatus for carrying out various types of aerobic fermentations in such a manner that the same will proceed at optimum values of dissolved oxygen concentration for the desired substrate concentration, generally the maximum possible substrate concentration.

Other objects and advantages of the present invention will become apparent from a further reading of the description and of the appended claims.

In the present specification, the cultivation of yeast is referred to as a specific example of the method of the present invention, which method, however, is not limited to the cultivation of yeast. Optimum values are described herein below for the production of yeast without any alcohol formation and so as to approach theoretical values of yeast formation.

With the above and other objects in view, the present invention contemplates a method of aerobic cultivation of microorganisms in contact with a liquid culture medium and under admission of oxygen-containing gas, comprising the steps of introducing oxygen-containing gas into a liquid, nutrient-containing culture medium having microorganisms distributed therethrough, determining the concentration of dissolved oxygen in the liquid culture medium, and adding nutrient to the microorganisms-containing liquid culture medium when the concentration of dissolved oxygen in the liquid culture medium exceeds a predetermined value, so as to maintain by such addition of nutrient the dissolved oxygen concentration in the liquid culture medium within predetermined limits.

The present invention also includes a fermentation arrangement, comprising, in combination, a fermentation vessel adapted to hold a nutrient-containing liquid culture medium and microorganisms to be cultured therein, storage means for storing nutrient, dispensing means for introducing, when actuated, nutrient from the storage means into the fermentation vessel, and sensing means at least partially located in the fermentation vessel and operatively connected to the dispensing means for determining the concentration of dissolved oxygen in the liquid culture medium in the fermentation vessel and for actuating the dispensing means when the concentration rises above a preset limit.

The present invention thus provides a method and apparatus for the aerobic cultivation of microorganisms on liquid culture media with admission of air, wherein the concentration of dissolved oxygen is continuously determined and compared with a predetermined value by means of an electrochemical detecting device, for instance a polarographic device which is adapted to convert any deviations of the dissolved oxygen concentration from a desired value into an electric signal which by suitable relays controls the supply of fresh culture medium from a storage bin to the fermentation vessel. The equipment required for this purpose consists of a fermentation vessel, supply means of supplying liquid culture media to the fermentation vessel, an air conduit for introducing air into the fermentation vessel, and measuring and control equipment which may comprise a system of electrodes covered up by a membrane which is permeable to oxygen and which system of electrodes is connected in series with an amplifier, an automatic controller connected to the amplifier and controlling for instance a servo motor the latter in turn actuating an inlet valve for introducing liquid culture medium into the fermentation tank.

Preferably, the system used for measuring the dissolved oxygen concentration is a polarographic method with Clark type electrodes such as is described for instance in U.S. Patent No. 2,913,386. However, the present invention is not limited to any specific kind of electrodes or sensing device since all sensors which react to changing dissolved oxygen concentrations are suitable.

Thus, the present invention proposed to determine the concentration of dissolved oxygen in the liquid culture medium in the fermentation vessel and to maintain a desired concentration of dissolved oxygen by introducing additional liquid culture medium whenever the concentration of dissolved oxygen exceeds a predetermined optimum value.

In addition, several other conditions such as the concentration of microorganisms, the intensity of aeration, based on the specific oxygen uptake rate of the respective microorganisms, should be controlled so that desirable limits of the growth capabilities of the microorganisms are not exceeded. In addition to the control of the rate of introduction of nutrients into the growing aerobic culture of microorganisms based on measuring the dissolved oxygen concentration in hte culture medium, the level of nutrient concentration and the growth rate of the growing microorganisms can be controlled by the method of the present invention. This method, therefore permits to maintain automatically optimum conditions for a variety of growing microbial cultures.

It has been found according to the present invention that the reaction of microorganisms, by which they respond to an addition or exhaustion of the nutrient in a liquid culture medium is so fast that it can be used for the control of the culture medium supply as described herein. Thus, according to the present invention, by keeping the oxygen concentration at about 15.5% of the oxygen solubility, i.e., at about 1.2 mg. $O_2$ per liter in the culture medium, it is possible to obtain a yield of 33.5% of dry yeast substance on molasses media.

In addition, the efficiency of the aeration and thereby the productivity of the manufacturing process is increased according to the present invention. Since the inflow of nutrient medium according to the present invention will correspond exactly to the changes in the aeration intensity which appear to be unavoidable in the operation of large scale fermentation equipment, the concentration of the nutrient in the culture medium is maintained at an optimum value which, for instance, in the production of yeast will not permit the formation of alcohol and thus will give very high yields of yeast formation.

For the production of a biomass, such as yeast production, it is necessary to keep the dissolved oxygen concentration at which additional nutrient medium will be introduced at the critical or optimum oxygen concentration, or slightly above it. To keep the oxygen concentration slightly above the critical or optimum oxygen concentration is desirable because of limitations of the sensitivity of the electrode to changes in the dissolved oxygen concentration. A certain time lag in the response of the control apparatus and fluctuation of the measured dissolved oxygen concentration due to imperfect mixing, bubbles, etc. The control point at which nutrient medium will be admitted should be set above the critical oxygen concentration so that the dissolved oxygen concentration, even when fluctuating within certain limits due to the imperfections of the physical design or equipment, will never fall below the critical oxygen concentration. This difference between dissolved oxygen concentration and critical oxygen concentration preferably is determined experimentally in any given case and will depend on the accuracy of the measuring system and the degree of turbulence found in the fermenting device or reaction vessel.

The term critical oxygen concentration is meant to denote such dissolved oxygen concentration immediately below which the specific oxygen uptake rate of the microorganisms, i.e., the respiration of the same, not limited by other nutrients other than oxygen, will just become dependent on the oxygen concentration. Above this value of dissolved oxygen concentration, the respiration of the particular microbe is independent of oxygen concentration and will be constant. In other words, above the critical oxygen concentration, increase in the oxygen concentration will not increase the respiratory processes. This value, namely the critical oxygen concentration is well defined and frequently used in the technical literature. It can be found, for instance, in Steel, "Biochemical Engineering, Heywood and Co., London, 1958, p. 158; or R. T. Finn, "Bacteriological Review," 18, 254, 1954.

According to the present invention, it has been found that the reaction of microorganisms by which they respond to the addition or exhaustion of a nutrient in the liquid culture medium is so fast that this reaction can be used for control of the supply of culture medium.

For instance, by adjusting the dissolved oxygen concentration to as little as 15.5% of the oxygen solubility, it is possible to obtain a yield of 33.5% of dry yeast substance. In addition, the efficiency of aeration and thereby the productivity of the manufacturing procedure are increased. Since the inflow of nutrient according to the present invention will correspond exactly to the changes of the intensity of aeration, which are unavoidable in large scale equipment, being less when lower oxygen dissolution rate allows only a lower growth and assimilation rate, and vice versa, the concentration of nutrients in the medium is always kept at the desired value. In the case of yeast cultivation this substrate or nutrient concentration is kept at very low values which do not permit alcohol formation. The oxygen dissolution rate may vary due to voltage fluctuations and corresponding changes in the output of the air compressor or in the rotational speed of the stirrer or due to anti-foam or ammonia additions, variation of temperature, manipulation of air valves on other fermenters, etc. All these changes which affect the dissolved oxygen concentration are then exactly followed by an increase or decrease of the inflow of nutrients, and the optimum conditions for growth of the microbes are thus maintained in the fermenting apparatus. The oxygen absorption and production capacity in the fermenting apparatus thus finds always optimum utilization. It is for instance possible in the production of yeast to operate with an air consumption of about 5 m.$^3$ per kilogram of new dry yeast substance formed.

Figure 2:
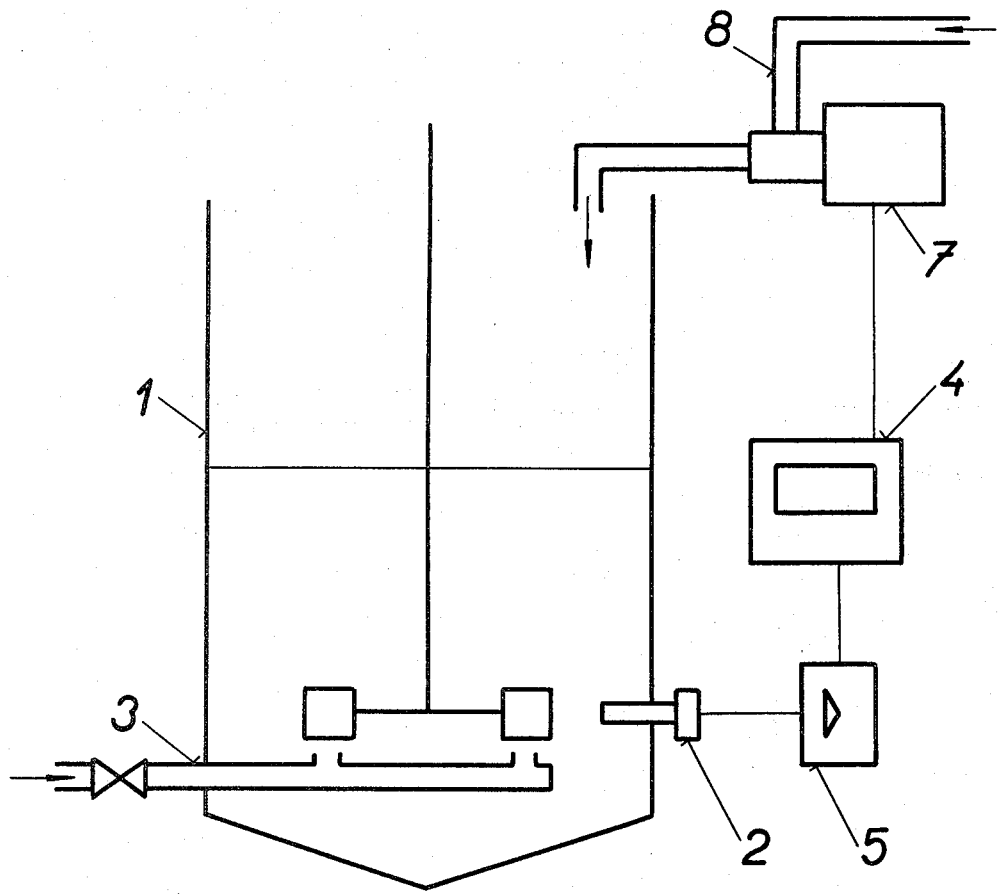

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of a fermentation arrangement according to the present invention wherein the supply of fresh culture medium is controlled by an inlet valve; and FIG. 2 is a schematic illustration of a fermentation arrangement according to the present invention wherein the admission of fresh culture medium is controlled by a metering pump.

Referring now to the drawing, and particularly to FIG. 1, fermentation vessel 1 is shown which is served by an air inlet duct 3 and by a culture medium inlet duct 8. In the wall of the vessel is mounted a set of electrodes 2 covered by a membrane permeable to oxygen. The membrane is connected in series with an amplifier 5, a regulator 4 and a controlled inlet valve 6.

The embodiment shown in FIG. 2 differs from that of FIG. 1 by having valve 6 replaced by metering pump 7.

The following examples are given as illustrative only, without, however, limiting the invention to the specific details of the examples.

Example 1

In the cultivation of *Saccharomyces cerevisiae* yeast, the addition of molasses substrate or culture medium was controlled in accordance with the concentration of dissolved oxygen, measured polarographically by means of fixed or stationary electrodes covered by an oxygen-permeable membrane. The concentration of dissolved oxygen was maintained at between 2 and 3 mg. $O_2$ per liter. The pH of the nutrient liquid was 4.8. Within 4 hours and 15 minutes from the start of the experiment, the concentration of the dry yeast substance increased from an original concentration of 0.68% to a concentration of 1.68%, and from the 100 kilograms of saccharose and other nutrients originally contained in the molasses, there were produced 70.5/kg. of dry yeast substance. The yield was thus 35% of dry yeast substance based on molasses with a content of 50% of polarizing sugar.

According to the present invention, the culture medium located in the fermentation tank or vessel in which electrodes are placed for measuring the dissolved oxygen concentration, is aerated by a continuous admission of such an amount of air and at such a speed of revolution of the agitator that, at a concentration of the chosen limiting nutrient in the liquid culture medium which under the given conditions insures a maximum rate of consumption of oxygen ($Q_{max}$), the value of concentration of the oxygen dissolved in the culture medium ($C_1$) is as low as ($C_{1\ min}$) and is situated near zero. After the limiting nutrient in the liquid culture medium has been consumed, the specific rate of oxygen consumption (Q) of the microorganism is reduced up to a value of ($Q_{min}$) while the concentration of dissolved oxygen ($C_L$) increases according to the equation:

$$C_L = C - \frac{Qx}{K_L a}$$

given by the endogenous metabolism of the microbe up to a value of ($Q_{min}$). This value is relatively high ($C_{L\ max}$) approaching the solubility C of oxygen in the liquid culture medium.

Example 2

In an aerated fermenter of 20,000 liter working volume, equipped with oxygen electrodes for dissolved oxygen concentration measurement and connected to a regulating device or controller for the control of the inflow of diluted molasses, Saccharomyces cerevisiae was cultivated at 30° C. and the pH was kept within the limits of 4.5–5.5 by suitable additions of 20% aqueous ammonium hydroxide. Diluted beet molasses were used as the nutrient substrate and were prepared in a separate vessel by diluting molasses having a saccharose content of about 50%, with an equal amount of water.

As a starter 19,200 liters of water were mixed in the fermentor with 350 liters of the diluted molasses. 9 kg. $P_2O_5$ in the form of $(NE_4)_2HPO_4$, and 5 kg. $(NH_4)_2BO_4$ were added thereto.

The thus formed solution was seeded with 450 kg. of pressed yeast of 27% dry weight. After between 20 to 30 minutes of mixing and aeration, the air inflow was adjusted so that the dissolved oxygen concentration equalled 0.2 mg. per liter and the dissolved oxygen concentration limit for activating the controller was adjusted to 0.8 mg. per liter, so that the inflow of diluted molasses would automatically start when the dissolved oxygen concentration reached 0.8 mg. per liter and interrupted when the dissolved oxygen concentration fell below 0.8 mg. per liter.

After 6 hours and 45 minutes of automatic operation and adjustment of the pH within the range of between 4.5 and 5.5, the yeast cultivation was stopped and the total yeast dry weight in the fermentor was determined to be equal to 426 kilograms so that 304 kilograms new yeast dry weight substance were formed in the fermenting apparatus during the operation of the same. The total addition of molasses amounted to 915 kg. of 50% saccharose content, resulting in a yield of 33.2% of yeast dry weight based on the weight of molasses added. For the adjustment of the pH with ammonium hydroxide and in the form of the initial addition of diammonium phosphate and ammonium sulfate, 22.8 kg. of nitrogen were added during the cultivation period.

According to other suggestions for the control of the concentration of dissolved oxygen in fermentation processes, the oxygen dissolution rate in the medium is adjusted, for instance by changing the amount of air for aeration or the intensity of mixing. According to these suggestions, the oxygen uptake rate of the microorganisms is not controlled and is a function of substrate concentration under the condition of substrate limitation. In these cases, substrate concentration is an independent variable and may have all kinds of arbitrary values. This is the reason why it may uncontrollably and appreciably depart from optimum values for the particular microbial process. The specific oxygen uptake rate is related to growth or product formation rate and the latter in turn is related to substrate assimilation rate. To attain an optimum result, all rates and concentrations must be controlled so as to be maintained at optimum values or as near as possible to optimum values.

This is possible in accordance with the method of the present invention. It has now been found that the change of oxygen uptake rate after substrate addition to starved microbial cells, or after substrate exhaustion, is so rapid that these changes can be used for automatic control of substrate addition. Because it is difficult to measure directly and continuously the oxygen uptake rate, it is suggested according to the present invention to measure the oxygen concentration $C_L$ which is related to the specific oxygen uptake rate, Q, the concentration of microorganisms in medium $x$, oxygen absorption constant $K_L a$ and oxygen solubility under steady state conditions according to the formula:

$$C_L = C - \frac{Qx}{K_L a}.$$

After addition of substrate to starved cells, the value of Q increases up to a certain maximum value $Q_{max}$ which is characteristic for a given microbe and given conditions of the nutrient medium. Above a certain substrate concentration value $Q_{max}$ does not increase further and remains constant and independent of further substrate concentration increase. If Q increases, $C_L$ must decrease according to the above formula until it reaches a minimum value $C_{L\ min}$ corresponding to $Q_{max}$ under the assumption that other values remain constant or are changing only very slowly compared to the rate of change of Q. This is true in most cases, and valid in steady state fermentation. After exhaustion of substrate present in the medium by the metabolic activity of microbes, the value of their Q will diminish to the endogenous and low value ($Q_{min}$) and consequently $C_L$ will reach its highest value $C_{L\ max}$.

The present method is based on keeping the substrate concentration in the region corresponding to the values of $Q=0$ up to $Q_{max}$ by following values of $C_L$ by polarographic or other methods, which values of $C_L$ give an indication of the steady state relations between oxygen dissolution rate and oxygen uptake rate by the respective microorganisms. Thereafter further inflow of substrate is permitted only when dissolved oxygen content is higher than a set value of $C_L$ or, in other words, when the oxygen uptake rate, and related growth or product formation rate, are slower than the oxygen dissolution rate allowed. In this case, the dissolved oxygen concentration can be kept at any value which is necessary either for growth limited by the amount of dissolved oxygen or for growth unlimited by the oxygen supply. The concentration of nutrients may attain any value between a value which is practically equal to zero and a concentration which ensures $Q_{max}$ of the microbe, by suitable choice of the dissolved oxygen concentration set point $C_L$ and its relation to $C_{Lmin}$. If $C_{Lmin}$ is close to $C_L$, then the substrate concentration is near the value necessary for $Q_{max}$; if it is distant therefrom, the substrate concentration approaches zero.

Values for $C_{L\ min}$ must be found experimentally, and steady state values of concentration of substrate must be determined by suitable analytical methods for the particular microbe and medium. The value of $C_{L\ min}$ is found simply by adding slowly more and more substrate until the value of $C_L$ does not diminsh further and remains constant. This is then the value of $C_{L\,min.}$.

Example 3

In the cultivation of *S. cerevisiae* under the conditions of Example 2 and a yeast dry weight concentration of 6 grams per liter, the value of $C_{L\,min.}$ under the aeration conditions employed was found to be 3 mg. oxygen per liter. This value did not decrease upon further addition of substrate for 10–15 minutes.

After substrate exhaustion, the value of $C_L$ increased gradually to 6.8 mg. $O_2$ per liter. Oxygen solubility at 30° C. and normal barometric pressure of 760 mm. Hg, was 7.5 mg. $O_2$ per liter, $Q_{max.}$ found by the polarographic method was 130 mg. of oxygen per gram of yeast dry weight per hour. Critical oxygen concentration for yeast was found according to the published literature to be about 0.2 mg. $O_2$ per liter, so that the 3 mg. per liter value was well above the critical oxygen concentration. Setting the $C_L$ control point at 3.5 mg. per liter and controlling in the described way the inflow of molasses, an approximate concentration of sucrose of about 300 mg. per liter was obtained and a specific growth rate of about 0.195 corresponding to doubling of the yeast present in about 3.5 hours. By setting the control point at $C_L = 6.5$ mg. $O_2$ per liter, a substrate concentration very close to, practically equal to, zero was obtained so that the substrate could no longer be determined by chemical methods, and a growth rate, corresponding to a doubling time of between 6 and 9 hours. The value of $C_{L\,min.}$ may be determined later during the fermentation by increasing by manual control the substrate inflow to the point where $C_L$ reaches its minimum. It is possible then to correct the $C_{L\,min.}$ value by adjusting air flow or intensity of aeration so that the $C_{L\,min.}$ value remains in the same relation to the set point $C_L$ even if the concentration of microorganisms changes. It is of course sufficient to do so two or three times during a normal 10–12 hours fermentation, as practiced in the manufacture of baker's yeast.

The automatic control, according to the present invention, as shown in FIGS. 1 and 2 of the drawing, is accomplished within a range determined by the values $C_{L\,min.}$ and $C_{L\,max.}$ in such a way that the output signal from the measuring equipment 2 for estimating of the dissolved oxygen concentration, after amplification in amplifier 5, if necessary, is used by way of automatic controller 4 for control of a governor valve 6 or of a metering pump 7 which controls the admission 8 of new portions of a liquid culture medium to the fermentation vessel 1, to which air is supplied through duct 3, so as to make the concentration of the oxygen dissolved in the culture medium ($C_L$) vary within preestablished limits.

The method of the present invention can be easily carried out in a continuous manner, namely in such a steady state operation during which an amount by volume of substrate or liquid culture medium is withdrawn which corresponds to the amount by volume of liquid nutrient which is introduced into the fermentation tank in response to an increase of dissolved oxygen in the liquid culture medium above a predetermined maximum value.

The fermenter, i.e., the tank in which the fermentation process or the cultivation of the micro-organism is carried out, should be equipped with a stirrer to ensure homogeneity of its contents, and an overflow outlet is provided in the fermenter wall at a desired height and preferably opposite from where additional nutrient is introduced into the fermenter. In this manner, namely by discharging fermenter contents at the overflow level, the total volume in the fermenter will remain constant during the continuous process. Thus, the method of the present invention can be operated continuously while maintaining a constant volume and concentration of micro-organisms in the fermenter. This is an improvement over the batch method according to which the fermenter is charged only to part of its capacity and additional nutrient is added, corresponding to increase in the dissolved oxygen concentration, until the fermenter is filled. When such final volume has been reached, the batch process is finished.

The batch method and the continuous method may be combined by starting with the batch method which has the advantage of requiring only a relatively small amount of inoculum, which may be valuable or uneconomical to prepare, and continuing with the continuous flow method as soon as the liquid culture medium in the fermenter reaches the overflow level.

The control of the concentration of dissolved oxygen is the same in both cases and while carrying out the continuous flow method, the additional advantage is achieved that the concentration of microorganisms will remain constant and no adjustment of $C_{L\,min.}$ in relation to the set point of $C_L$ by changing the intensity of aeration will be necessary.

It will be understood that each of the elements described above, or two or more together, may also find a useful application in other types of devices for controlled fermentation processes differing from the types described above.

While the invention has been illustrated and described as embodied in a method and apparatus for the fermentative production of yeast, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of aerobic cultivation of microorganisms in contact with a liquid culture medium and under admission of oxygen-containing gas, comprising the steps of introducing oxygen-containing gas into a liquid, nutrient-containing culture medium having microorganisms distributed and growing therethrough; continuously determining the concentration of dissolved oxygen in said liquid culture medium; and adding nutrient to said microorganisms-containing liquid culture medium as soon as the concentration of dissolved oxygen in said liquid culture medium exceeds a predetermined optimum value in an amount sufficient to maintain the dissolved oxygen concentration in said liquid culture medium within predetermined limits.

2. A fermentation arrangement, comprising, in combination, a fermentation vessel adapted to hold a nutrient-containing liquid culture medium and microorganisms to be cultured therein; storage means for storing nutrient; dispensing means for introducing, when actuated, nutrient from said storage means into said fermentation vessel; and sensing means at least partially located in said fermentation vessel and operatively connected to said dispensing means for determining the concentration of dissolved oxygen in said liquid culture medium in said fermentation vessel and for actuating said dispensing means when said concentration rises above a preset limit.

3. A fermentation arrangement, comprising, in combination, a fermentation vessel adapted to hold a nutrient-containing liquid culture medium and microorganisms to be cultured therein; storage means for storing nutrient; dispensing means including valve means for introducing, when actuated, nutrient from said storage means into said fermentation vessel; and sensing means at least partially located in said fermentation vessel and operatively connected to said dispensing means for determining the concentration of dissolved oxygen in said liquid culture medium in said fermentation vessel and for actuating said dispensing means when said concentration rises above a preset limit.

4. A fermentation arrangement, comprising, in combination, a fermentation vessel adapted to hold a nutrient-containing liquid culture medium and microorganisms to be cultured therein; storage means for storing nutrient; dispensing means including a metering pump for introducing, when actuated, nutrient from said storage means into said fermentation vessel; and sensing means at least partially located in said fermentation vessel and operatively connected to said dispensing means for determining the concentration of dissolved oxygen in said liquid culture medium in said fermentation vessel and for actuating said dispensing means when said concentration rises above a preset limit.

5. A fermentation arrangement, comprising, in combination, a fermentation vessel adapted to hold a liquid nutrient-containing liquid culture medium and microorganisms to be cultured therein; storage means for storing liquid nutrient; dispensing means for introducing, when actuated, liquid nutrient from said storage means into said fermentation vessel; and sensing means at least partially located in said fermentation vessel and operatively connected to said dispensing means for determining the concentration of dissolved oxygen in said liquid culture medium in said fermentation vessel and for actuating said dispensing means when said concentration rises above a preset limit, said sensing means including a set of electrodes covered by a membrane permeable to oxygen and in contract with said liquid culture medium in said fermentation vessel.

6. A method of aerobic cultivation of microorganisms in contact with a liquid culture medium and under admission of oxygen-containing gas, comprising the steps of introducing oxygen-containing gas at a substantially constant rate into a liquid, nutrient-containing culture medium having microorganisms distributed and growing therethrough; continuously determining the concentration of dissolved oxygen in said liquid culture medium; and automatically adding liquid nutrient to said microorganisms-containing liquid culture medium as soon as the concentration of dissolved oxygen in said liquid culture medium exceeds a predetermined optimum value in an amount sufficient to maintain the dissolved oxygen concentration in said liquid culture medium within predetermined limits.

7. A method of aerobic fermentative production of yeast in contact with a liquid, nutrient-containing culture medium, comprising the steps of introducing oxygen-containing gas into a fermenting mass containing liquid culture medium and yeast distributed and growing therethrough; continuously sensing the change in the dissolved oxygen concentration in said fermenting mass; translating said change when the same reaches a predetermined value into an electric signal; and continuously controlling the flow of additional culture medium into said fermenting mass responsive to said electric signal so that additional culture medium will flow into said fermenting mass in such an amount that the dissolved oxygen concentration in said fermenting mass will not rise above said predetermined value.

8. A method of aerobic fermentation by means of microorganisms in contact with a liquid culture medium and under admission of oxygen-containing gas, comprising the steps of introducing oxygen-containing gas into a liquid, nutrient-containing culture medium having microorganisms distributed and growing therethrough; continuously determining the concentration of dissolved oxygen in said liquid culture medium; and adding nutrient to said microorganisms-containing liqud culture medium as soon as the concentration of dissolved oxygen in said liquid culture medium exceeds a predetermined optimum value in an amount sufficient to maintain the dissolved oxygen concentration in said liquid culture medium during said fermentation within predetermined limits.

9. A continuous method of aerobic cultivation of microorganisms in contact with a liquid culture medium and under admission of oxygen-containing gas, comprising the steps of continuously introducing oxygen-containing gas into a liquid, nutrient-containing culture medium having microorganisms distributed and growing therethrough; continuously determining the concentration of dissolved oxygen in said liquid culture medium; adding nutrient to said microorganisms-containing liquid culture medium as soon as the concentration of dissolved oxygen in said liquid culture medium exceeds a predetermined value and with drawing an amount of liquid culture medium substantially equal to the volume of the added nutrient, so as to keep the volume of liquid culture medium substantially constant, and so as to maintain by such addition of nutrient the dissolved oxygen concentration in said liquid culture medium within predetermined limits.

10. A method as defined in claim 1 wherein said microorganism is yeast.

11. A method as defined in claim 1, wherein said microorganism is *Saccharomyces cerevisiae*.

12. A method as defined in claim 6, wherein said microorganism is yeast.

13. A method as defined in claim 6, wherein said microorganism is *Saccharomyces cerevisiae*.

14. A method as defined in claim 7, wherein said yeast is *Saccharomyces cerevisiae*.

15. A method as defined in claim 8, wherein said microorganism is yeast.

16. A method as defined in claim 9, wherein said microorganism is yeast.

17. A method as defined in claim 9, wherein said microorganism is *Saccharomyces cerevisiae*.

References Cited

Rose, Industrial Microbiology, London, Bullerworth and Co. Ltd., pp. 85 to 88, 93, 94 and 99 to 103, 1961.

ALVIN E. TANENHOLTZ, *Primary Examiner.*